US008966432B1

(12) United States Patent
Klein

(10) Patent No.: US 8,966,432 B1
(45) Date of Patent: Feb. 24, 2015

(54) REDUCTION OF JITTER IN AN INTEGRATED CIRCUIT

(71) Applicant: Xilinx, Inc., San Jose, CA (US)

(72) Inventor: Matthew H. Klein, Redwood City, CA (US)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 14/019,897

(22) Filed: Sep. 6, 2013

(51) Int. Cl.
*G06F 17/50* (2006.01)

(52) U.S. Cl.
CPC ........ *G06F 17/5068* (2013.01); *G06F 17/5031* (2013.01)
USPC ............................ 716/134; 716/108; 716/113

(58) Field of Classification Search
USPC .......................................................... 716/100
See application file for complete search history.

(56) References Cited

U.S. PATENT DOCUMENTS

| | | | |
|---|---|---|---|
| 6,442,722 B1* | 8/2002 | Nadeau-Dostie et al. | 714/731 |
| 6,536,024 B1* | 3/2003 | Hathaway | 327/295 |
| 6,738,963 B2* | 5/2004 | Chaudhari | 716/113 |
| 6,836,877 B1* | 12/2004 | Dupenloup | 716/103 |
| 7,102,402 B2* | 9/2006 | Kurd et al. | 327/158 |
| 7,162,705 B2* | 1/2007 | Chaudhari | 716/130 |
| 7,359,468 B2* | 4/2008 | Danzig et al. | 375/355 |
| 7,509,608 B1* | 3/2009 | Duong | 716/113 |
| 7,526,666 B1* | 4/2009 | Soni | 713/500 |
| 8,072,253 B2* | 12/2011 | Kaeriyama et al. | 327/231 |
| 8,661,384 B2* | 2/2014 | Iwashita | 716/108 |
| 2004/0003361 A1* | 1/2004 | Chaudhari | 716/6 |
| 2004/0216066 A1* | 10/2004 | Chaudhari | 716/8 |

* cited by examiner

*Primary Examiner* — Leigh Garbowski
(74) *Attorney, Agent, or Firm* — Kevin T. Cuenot

(57) ABSTRACT

Reducing jitter in a circuit design includes selecting a plurality of circuit elements of a circuit design clocked using a first clock signal and assigning, using a processor, the plurality of circuit elements to different ones of a plurality of groups according to a balancing criterion. The circuit elements assigned to a first group of the plurality of groups are clocked using the first clock signal. The circuit elements assigned to a second group of the plurality of groups are clocked using a second clock signal different from the first clock signal.

20 Claims, 5 Drawing Sheets

US 8,966,432 B1

REDUCTION OF JITTER IN AN INTEGRATED CIRCUIT

FIELD OF THE INVENTION

This specification relates to integrated circuits (ICs) and, more particularly, to reducing jitter within an IC.

BACKGROUND

One potential source of jitter within an electronic circuit arises from the simultaneous switching of synchronous circuit elements. When the output of a synchronous circuit element transitions from one state to another on a clock edge, the circuit element generates a current pulse that occurs on the clock edge. Each synchronous circuit element that transitions on a same clock edge contributes to the current pulse. The more synchronous circuit elements switching at the same time, the larger the resulting current pulse.

Because of the large number of synchronous circuit elements within a modern IC design, the transitioning of synchronous circuit elements on any given clock edge within a selected clock domain becomes randomized. This randomization means that for each clock edge within the selected clock domain, approximately a same number of synchronous elements will transition. As a result, the electronic circuit generates a current pulse of substantially the same magnitude on each clock transition edge of the clock domain.

Each current pulse, however, causes a fluctuation in the internal power grid of the electronic circuit. More particularly, the supply voltage provided to various circuit elements within the electronic circuit fluctuates by a small amount that is proportional to the size of the current pulses that are generated. This fluctuation in the power supply voltage induces unwanted jitter that may reduce performance of the electronic circuit.

SUMMARY

A method of reducing jitter in a circuit design includes selecting a plurality of circuit elements of a circuit design clocked using a first clock signal, assigning, using a processor, the plurality of circuit elements to different ones of a plurality of groups according to a balancing criterion, and clocking the circuit elements assigned to a first group of the plurality of groups using the first clock signal. The method also can include clocking the circuit elements assigned to a second group of the plurality of groups using a second clock signal different from the first clock signal.

A system includes a processor coupled to a memory storing program code. The processor, upon executing the program code, is programmed to initiate executable operations. The executable operations include selecting a plurality of circuit elements of a circuit design clocked using a first clock signal, assigning the plurality of circuit elements to different ones of a plurality of groups according to a balancing criterion, and clocking the circuit elements assigned to a first group of the plurality of groups using the first clock signal. The executable operations also include clocking the circuit elements assigned to a second group of the plurality of groups using a second clock signal different from the first clock signal.

A non-transitory computer-readable storage medium includes instructions which, when executed by a processor, perform a method. The method includes selecting a plurality of circuit elements of a circuit design clocked using a first clock signal, assigning the plurality of circuit elements to different ones of a plurality of groups according to a balancing criterion, clocking the circuit elements assigned to a first group of the plurality of groups using the first clock signal, and clocking the circuit elements assigned to a second group of the plurality of groups using a second clock signal different from the first clock signal.

DETAILED DESCRIPTION OF THE DRAWINGS

Figure 1:
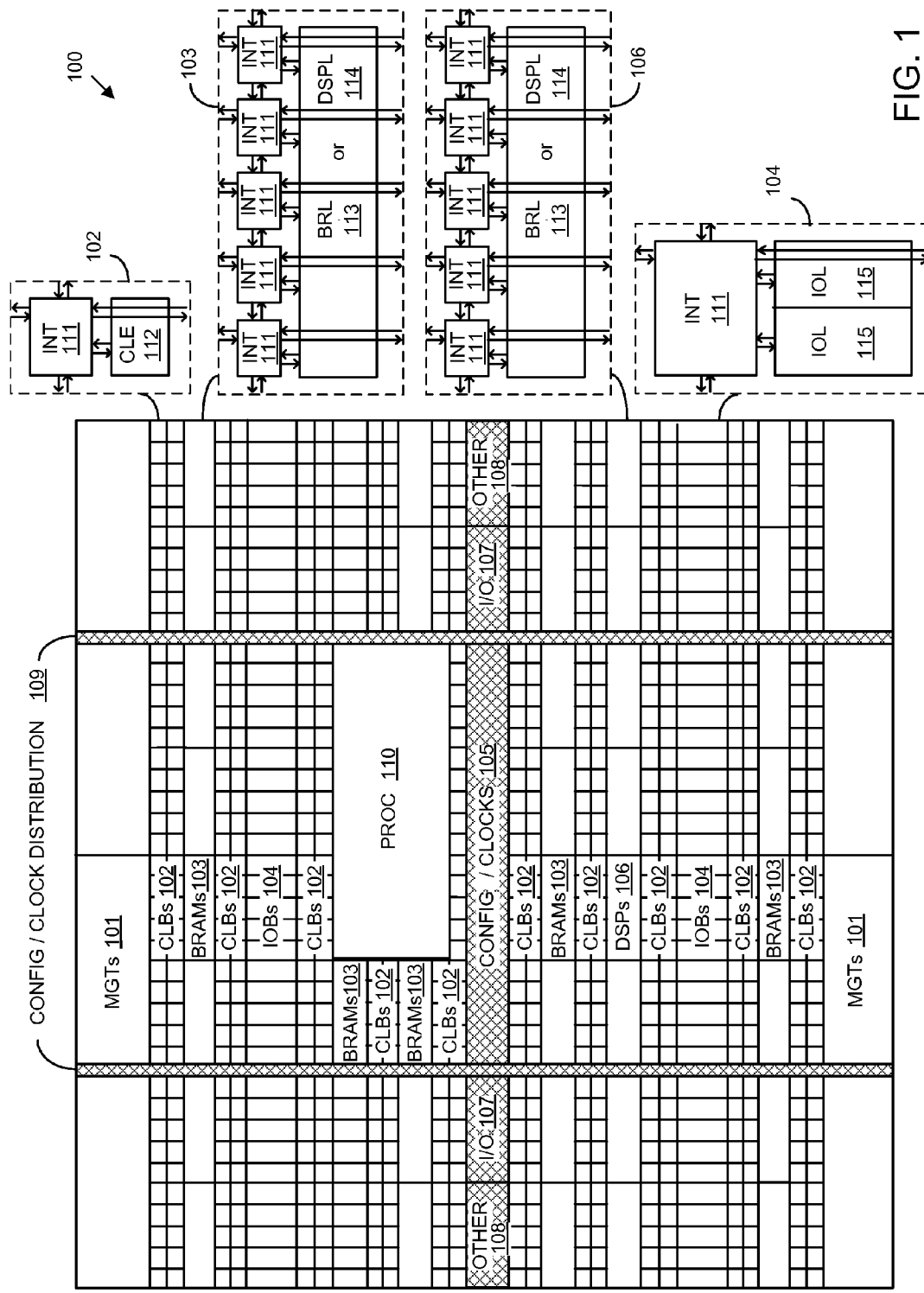
FIG. 1 is a block diagram illustrating an exemplary architecture for an integrated circuit (IC).

While the specification concludes with claims defining novel features, it is believed that the various features disclosed within this specification will be better understood from a consideration of the description in conjunction with the drawings. The process(es), machine(s), manufacture(s) and any variations thereof described within this specification are provided for purposes of illustration. Specific structural and functional details disclosed within this specification are not to be interpreted as limiting, but merely as a basis for the claims and as a representative basis for teaching one skilled in the art to variously employ the features described in virtually any appropriately detailed structure. Further, the terms and phrases used within this specification are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to integrated circuits (ICs) and, more particularly, to reducing jitter within an IC. In accordance with the inventive arrangements disclosed within this specification, a circuit design is evaluated to identify synchronous circuit elements within a clock domain. The synchronous circuit elements of the clock domain are evaluated using one or more balancing criteria. Based upon the evaluation, the synchronous circuit elements are assigned to different groups. Each resulting group of synchronous circuit elements is implemented as a different clock domain. As such, the original clock domain is effectively transformed into a plurality of different clock domains.

Whereas "N" synchronous circuit elements switched at the same time for the original clock domain, a number of the synchronous circuit elements less than N switches at the same time after the transformation. While the resulting circuit design is logically equivalent to the original circuit design, the size of the current pulses generated on clock transition edges of the resulting clock domains are smaller than the current pulses generated for the original clock domain. While the smaller current pulses occur with greater frequency than the current pulse of the original clock domain, the smaller current pulses induce less noise on the voltage supply. As such, less jitter is present in the circuit design from the jitter reduction processing.

In one aspect, a method for reducing jitter within a circuit design is provided. The method is implemented by a system. The system may be implemented as a data processing system, e.g., a computer-based design tool, programmed to evaluate and operate upon a circuit design at any of a variety of different stages of development. A computer program product also is provided. The computer program product includes a non-transitory computer-readable storage medium that includes instructions. The instructions, when executed by a processor, e.g., the aforementioned system, cause the processor, or system as the case may be, to perform a method that reduces jitter within a circuit design.

FIG. 1 is a block diagram depicting an exemplary architecture 100 for an IC. In one aspect, architecture 100 is implemented within an FPGA type of programmable IC. As shown, architecture 100 includes several different types of programmable circuit, e.g., logic, blocks in the array. For example, architecture 100 includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Architecture 100 also can include a dedicated processor block (PROC) 110.

Within architecture 100, each programmable tile can include a programmable interconnect element (INT) 111 having standardized connections to and from a corresponding INT 111 in each adjacent tile. Therefore, INTs 111, taken together, implement the programmable interconnect structure for architecture 100. Each INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) can also be used. A DSP tile 106 can include a DSP logic element (DSPL) 114 in addition to an appropriate number of INTs 111. An IOB 104 can include, for example, two instances of an input/output logic element (IOL) 115 in addition to one instance of an INT 111. As will be clear to those of skill in the art, the actual I/O pads connected, for example, to the I/O logic element 115 typically are not confined to the area of IOL 115.

In the example pictured in FIG. 1, a horizontal area near the center of the die, e.g., formed of regions 105, 107, and 108 is used for configuration, clock, and other control logic. Vertical columns 109, referred to as configuration/clock distribution regions (CONFIG/CLOCK DISTRIBUTION), extending from this horizontal area are used to distribute the clocks and configuration signals across the breadth of the IC.

Some ICs utilizing architecture 100 include additional logic blocks that disrupt the regular columnar structure making up a large part of the IC. The additional logic blocks can be programmable blocks and/or dedicated circuitry, e.g., logic. For example, a processor block such as PROC 110 spans several columns of CLBs and BRAMs.

FIG. 1 is intended to illustrate only an exemplary architecture that can be used to implement an IC that includes programmable circuitry. For example, the number of circuit blocks (or tiles) in a row, the relative width of the rows, the number and order of rows, the types of circuit blocks included in the rows, the relative sizes of the circuit blocks, and the interconnect/logic implementations included at the top of FIG. 1 are purely exemplary. In an actual FPGA, for example, more than one adjacent row of CLBs is typically included wherever the CLBs appear to facilitate the efficient implementation of user logic and/or circuit designs. Further, the number of adjacent CLB rows will vary with the overall size of the FPGA.

Some types of ICs such as programmable ICs include clock signal generation circuitry that generates and distributes clock signals throughout the IC with little skew. Within ICs where skew of the clock signal is tightly controlled, the effects of simultaneously switching circuit elements may be more pronounced than in other ICs where clock signals exhibit greater skew. For example, within various types of programmable ICs, e.g., FPGAs, that include a clock manager circuit block, the effects of simultaneously switching circuit elements may be more pronounced since elements switch at substantially the same time with little variation from clock skew. Other exemplary ICs where the effects of simultaneously switching circuit elements may be more pronounced in terms of generating increased jitter include, but are not limited to, application specific standard products (ASSPs), application specific integrated circuits (ASICs), or the like. Notwithstanding the foregoing, the jitter reduction techniques described within this specification may be applied to any of a variety of IC whether or not such IC is programmable and/or has the same or a similar architecture as described with reference to FIG. 1.

Figure 2:
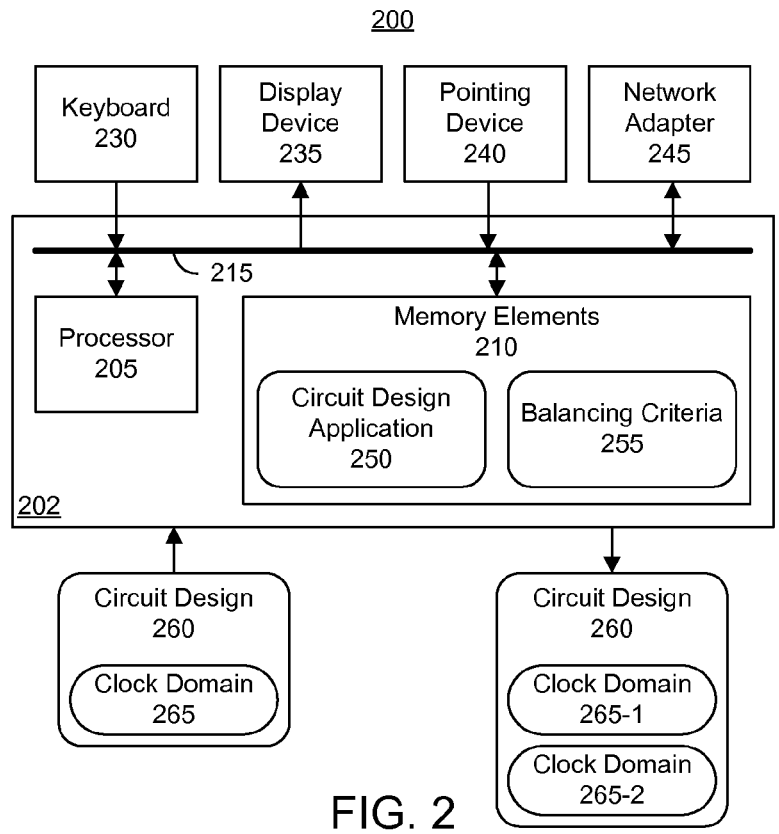
FIG. 2 is a block diagram illustrating an exemplary implementation of a data processing system.

FIG. 2 is a block diagram illustrating an exemplary implementation of a data processing system (system) 200. System 200 illustrates an example of a circuit design tool also referred to as an electronic design automation tool or system. In general, system 200 is programmed to operate upon a received circuit design specified in any of a variety of different programmatic forms.

System 200 includes at least one processor, e.g., a central processing unit (CPU), 205 coupled to memory elements 210 through a system bus 215 or other suitable circuitry. System 200 stores program code within memory elements 210. Processor 205 executes the program code accessed from memory elements 210 via system bus 215. In one aspect, system 200 is implemented as a computer that is suitable for storing and/or executing program code. It should be appreciated, however, that system 200 can be implemented in the form of any system including a processor and memory that is capable of performing the functions described within this specification.

Memory elements 210 include one or more physical memory devices such as, for example, a local memory and one or more bulk storage devices. Local memory refers to random access memory or other non-persistent memory device(s) generally used during actual execution of the program code. The bulk storage device(s) can be implemented as a hard disk drive (HDD), solid state drive (SSD), or other persistent data storage device. System 200 also can include one or more cache memories (not shown) that provide temporary storage of at least some program code in order to reduce the number of times program code must be retrieved from the bulk storage device during execution.

Input/output (I/O) devices such as a keyboard 230, a display device 235, and a pointing device 240 optionally can be coupled to system 200. The I/O devices can be coupled to system 200 either directly or through intervening I/O controllers. A network adapter 245 also can be coupled to system 200 to enable system 200 to become coupled to other systems, computer systems, remote printers, and/or remote storage devices through intervening private or public networks. Modems, cable modems, Ethernet cards, and wireless transceivers are examples of different types of network adapter 245 that can be used with system 200.

As pictured in FIG. 2, memory elements 210 can store a circuit design application (application) 250 and one or more balancing criteria 255. Application 250, being implemented in the form of executable program code, is executed by system 200. As such, application 250 is considered part of system 200. When executed by system 200, and in particular processor 205, application 250, causes system 200 to initiate and/or perform one or more jitter reduction operations as part of a jitter reduction process upon a received circuit design such as circuit design 260.

While balancing criteria 255 is shown as being separate and/or distinct from application 250, it should be appreciated that balancing criteria 255 may be incorporated within application 250. In any case, application 250, balancing criteria 255, circuit design 260, and any data items utilized by system 200 while processing circuit design 260 are functional data structures that impart functionality when employed as part of system 200 or when loaded into IC such as a programmable IC.

In operation, system 200 receives circuit design 260 as input. Circuit design 260 may be specified using any of a variety of different formats and/or conventions, e.g., different programmatic forms. For example, circuit design 260 may be specified using a hardware description language, as a netlist, as a data flow graph, or the like. In any case, circuit design 260 includes a clock domain 265. Clock domain 265 includes a plurality of synchronous circuit elements.

A synchronous circuit element is a circuit element that generates an output synchronized with a reference signal, e.g., a clock signal, different from the data signal provided to the synchronous circuit element as an input. For example, any transition in the output of a synchronous circuit element occurs on a selected edge of the clock signal provided to the synchronous circuit element. As used herein, the term "clock transition edge" refers to a selected one of either a rising edge or a falling edge of a clock signal upon which synchronous circuit elements clocked by that clock signal transition or may transition. One example of a synchronous circuit element is a flip-flop.

System 200 evaluates circuit design 260 to identify clock domain 265. In one aspect, system 200 selects clock domain 265 from a plurality of different clock domains as a candidate for processing. In another aspect, a user selects clock domain 265 for processing. System 200 applies balancing criteria 255 to circuit design 260 and, in particular, to the selected clock domain.

Balancing criteria 255 is a collection of one or more rules that define how system 200 apportions or assigns synchronous circuit elements of a selected clock domain to different groups and, as such, to different clock domains. In applying balancing criteria 255 to circuit design 260, system 200 assigns synchronous circuit elements of clock domain 265 to two or more different groups. System 200 implements each of the resulting groups as a different clock domain of circuit design 265. As shown, subsequent to the processing and/or transformation performed by system 200, circuit design 260 includes a clock domain 265-1 and a clock domain 265-2 both derived from clock domain 265. Clock domains 265-1 and 265-2 are derived from clock domain 265 since the union of synchronous circuit elements of clock domains 265-1 and 265-2 are equal to the synchronous circuit elements of clock domain 265.

As use within this specification, the term "clock domain" is a collection of one or more circuit elements that are clocked by a same clock signal. Accordingly, the clock signal provided to each circuit element in a same clock domain has a same frequency and a same phase. A first circuit element clocked by a clock signal of a first frequency and a first phase is in a different clock domain than a second circuit element clocked by a clock signal of the first frequency and a second and different phase. A first circuit element clocked by a first clock signal with a first frequency is in a different clock domain than a second circuit element clocked by a clock signal of a second and different frequency.

Referring again to FIG. 2, clock domains 265-1 and 265-2 can be created using any of a variety of clock domain creation techniques. As an example, the first group of circuit elements corresponding to clock domain 265-1 may remain clocked by the original clock signal used for clock domain 265. The second group of circuit elements may be clocked by a second and different clock signal having a same frequency, but a different phase than the clock signal for clock domain 265-1.

In another example, the first group of circuit elements corresponding to clock domain to 265-1 may remain clocked by the original clock signal used for clock domain 265. The second group of circuit elements may be clocked by a second and different clock signal having a frequency twice that of the original clock signal. Each circuit element in the second group of circuit elements, however, is clock enabled only on even clock transition edges of the second clock signal to be described herein in further detail.

Figure 3:
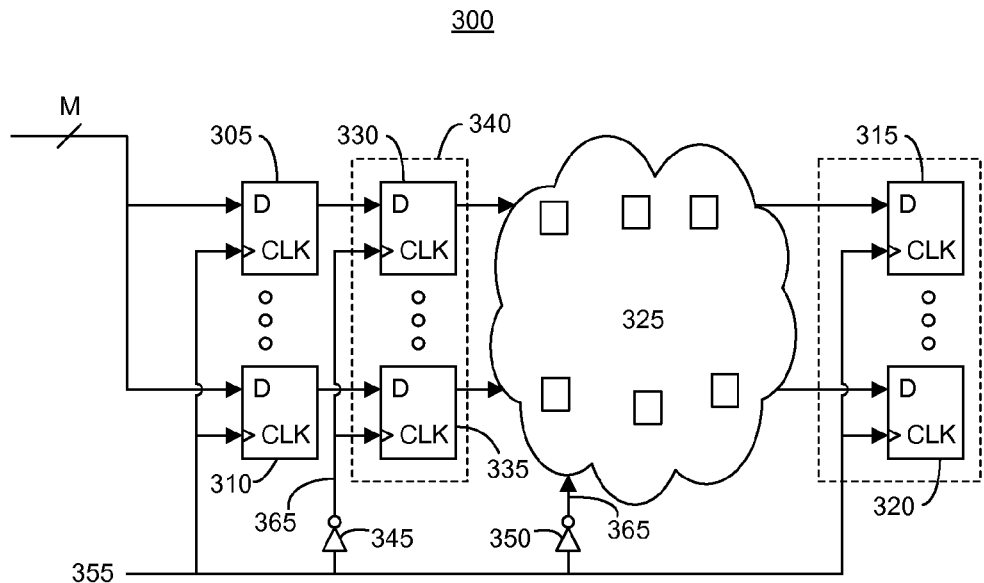
FIG. 3 is a block diagram illustrating an exemplary technique for creating a clock domain.

FIG. 3 is a block diagram illustrating an exemplary technique for creating a clock domain. FIG. 3 is a block diagram representing a portion of a programmatic circuit design (circuit design) 300 that is operated upon by system 200 of FIG. 2. In general, the synchronous circuit elements initially are in a same clock domain, e.g., a first clock domain. Circuit design 300 is transformed by creating a second clock domain that includes selected ones of the synchronous circuit elements. The example illustrated in FIG. 3 creates the additional clock domain by varying the phase of the clock signal provided to the synchronous circuit elements selected for inclusion in the second clock domain.

As pictured, circuit design 300 includes a plurality of flip-flops 305, 310, 315, and 320. Circuit design 300 includes one or more additional flip-flops illustrated by circuitry 325. Circuitry 325 includes or represents flip-flops of the first clock domain that are selected for use in creating a second and different clock domain. It should be appreciated that flip-flops are shown as one possible example of a synchronous circuit element. Other synchronous circuit elements may be used.

In its initial state, circuit design 300 does not include flip-flops 330 and 335. Rather, flip-flops 330 and 335, collectively referred to as adaptation flip-flops 340, are inserted once synchronous circuit elements of the first clock domain are selected for inclusion in the second clock domain that is to be created. Further, in its initial state, circuit design 300 does not include either one of inverters 345 or 350. As such, all synchronous circuit elements of circuit design 300 are initially driven by clock signal 355.

Once system 200 selects flip-flops for inclusion in the second clock domain that is to be created from, or out of, the first clock domain, additional circuit elements are inserted into circuit design 300. In particular, adaptation flip-flops 340 are inserted at the boundary between the first clock domain and the second clock domain. More particularly, system 200 evaluates circuit design 300 and selects the flip-flops within circuitry 325 as those to be included in the second clock domain. System 200 then inserts an adaptation flip-flop in the signal path linking each flip-flop pair, where each flip-flop pair is formed by a source flip-flop in the first clock domain and a load flip-flop to be included in the second clock domain that receives an output signal from the source flip-flop.

As shown, inverters 345 and 350 are inserted into circuit design 300 to process clock signal 355. Inverters 345 and 350 generate clock signal 360 for the second clock domain. Inverters 345 and 350 generate clock signal 360 having a same frequency as clock signal 355, but a phase that is 180 degrees different from that of clock signal 355.

In the example pictured in FIG. 3, inverters are used to generate the clock signal for the second clock domain. In other cases, for example, where the IC includes a clock generator circuit block that is operable to generate more than one clock signal of varying frequency and/or varying phase, the clock signal for the second clock domain may be obtained directly from the clock generator circuit block. Further, while FIG. 3 illustrates creating one additional clock domain from the original clock domain, it should be appreciated that two or more additional clock domains may be created from the original clock domain.

In illustration, the second clock domain generated from the first clock domain may have a clock signal with a same frequency as the first clock domain, but a phase that is offset by 90 degrees from the first clock domain. A third clock domain generated from the first clock domain may have a clock signal with a same frequency as the first clock domain, but a phase that is offset by 180 degrees from the first clock domain. A fourth clock domain generated from the first clock domain may have a clock signal with a same frequency as the first clock domain, but a phase that is offset by 270 degrees from the first clock domain.

Figure 4:
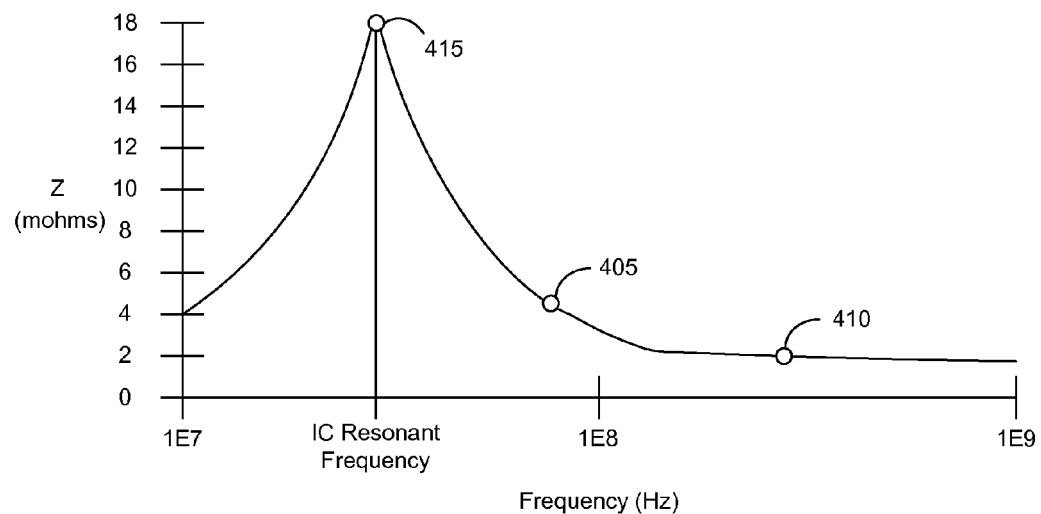
FIG. 4 is a graph plotting impedance of an IC against frequency.

FIG. 4 is a graph 400 plotting impedance of an IC against frequency. Each IC, e.g., as formed of a die and the packaging for that die, has an inductance and a capacitance. The impedance, in reference to the inductance and the capacitance, may be determined according to the size of the die and the materials used to fabricate the die and packaging. In general, the inductance of an IC is the inductance of the die itself and the source of the power supply for the die. The die, in combination with the power supply, form a resonant circuit that exhibits frequency dependence. FIG. 4 illustrates an exemplary plot of the impedance of such an IC. The vertical axis indicates impedance as measured in milliohms. The horizontal axis indicates frequency as measured in Hz. The frequency illustrated on the horizontal axis represents the switching rate of synchronous circuit elements, e.g., a clock rate.

For purposes of illustration, consider the case in which a circuit design, e.g., circuit design 300 of FIG. 3, has a clock rate of 77.76 MHz represented by point 405 in FIG. 4 prior to application of any jitter reduction processing. After application of the jitter reduction processing described in FIG. 3, approximately 50% of the synchronous circuit elements may be moved to the second, newly created clock domain. For purposes of illustration, the clock transition edge of each clock domain is the rising edge of the clock signal. In consequence, post jitter processing, 50% of the synchronous circuit elements transition according to a rising edge of clock signal 355, while the other 50% of the synchronous circuit elements transition at the rising edge of clock signal 365, which is 180 degrees out of phase with clock signal 355. This results in a doubling of the switching rate that moves the switching rate from 77.76 MHz to 155.52 MHz represented by point 410 in FIG. 4. As illustrated, the impedance is effectively reduced by half from approximately 4.4 mohms at point 405 to approximately 2 mohms at point 410.

The amount of current flowing, e.g., the magnitude of a current pulse, generated by transitioning synchronous circuit elements is the sum of the current generated by each synchronous circuit element that transitions at the same time. By generating multiple clock domains from a single clock domain, the number of synchronous circuit elements that transition at the same time is reduced. The current pulse generated on each clock edge is, therefore, similarly reduced.

In general, the amount of voltage noise that is generated by an IC that may be induced in the voltage supply may be determined by multiplying the impedance of the IC by the amount of current flowing for a current pulse. In the above example with reference to FIG. 3, when the number of synchronous circuit elements is reduced by half, the amount of current flowing on each clock transition edge is similarly reduced by half. It should be appreciated that increasing the frequency rate of the circuit design by creating the additional clock domain as described further reduces the impedance of the IC. Consider the case where circuit design 300 generated 1 unit of voltage noise prior to application of the jitter reduction processing. Post jitter reduction processing, the amount of voltage noise is reduced to 0.225 units. The amount of voltage noise reduction can be determined by dividing the post jitter processing impedance of 2 by the pre-jitter processing impedance of 4.4, resulting in a value of 0.45. The post-jitter processing current is divided by the pre-jitter processing current resulting in a value 0.5, which presumes 50% of the synchronous circuit elements were moved from the first clock domain to the second clock domain. In terms of the unit of voltage noise generated, the result is 0.45 multiplied by 0.5, which yields a value of 0.225 units.

The above example presumes that the initial, i.e., pre-jitter processing, location of the circuit design on the impedance curve of the IC represented by point 405 is to the right of the peak point 415, which represents the resonant frequency of the IC. Otherwise, the resulting voltage noise may actually increase. For example, were point 405 to be located to the left of point 415, point 410 may also be located to the left of point 415 yielding an increase in jitter. In any case, since the amount of voltage noise induced on the voltage supply of the IC is proportional to the amount of jitter that is induced, it can be seen from the prior example that jitter is reduced to 0.225 from a unit value of 1, i.e., a reduction of approximately 77.5%.

In the case of an IC, many internal components are uniformly affected by jitter so as not to cause any timing issues. With regard to output signals, however, jitter is often problematic since any other system external to the IC does not experience the same amount of jitter. Thus, any jitter on the I/O signals from the IC may cause significant timing issues. In addition, in many cases, internal clock rates, e.g., within an IC, are lower than the clock rates for I/Os and/or external clocks. In such cases, the lower frequency clocks within an IC tend to be aggressors on the higher frequency clocks. That is, the lower frequency internal clocks tend to induce jitter on the higher frequency clocks. As such, any reduction of jitter on internal clocks as described within this specification may significantly reduce jitter on the higher frequency clocks used for I/Os, e.g., external memory interfaces and the like.

Figure 5:
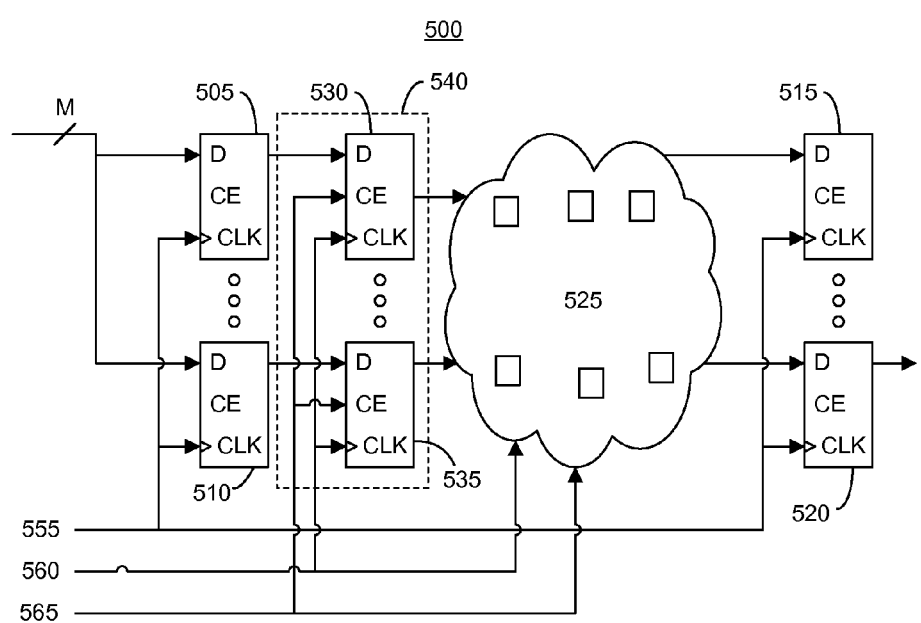
FIG. 5 is a block diagram illustrating another exemplary technique for creating a clock domain.

FIG. 5 is a block diagram illustrating another exemplary technique for creating a clock domain. FIG. 5 is a block diagram representing a portion of a programmatic circuit design (circuit design) 500 that is operated upon by system 200 of FIG. 2. In general, the synchronous circuit elements initially are in a same clock domain, e.g., a first clock domain as described with reference to FIG. 3. Circuit design 500 is transformed by creating a second clock domain that includes selected ones of the synchronous circuit elements. The example illustrated in FIG. 5 creates the additional clock domain using differing clock signal frequencies and clock enables.

As pictured, circuit design 500 includes a plurality of flip-flops 505, 510, 515, and 520. Circuit design 500 includes one or more additional flip-flops illustrated by circuitry 525. Circuitry 525 includes flip-flops of the first clock domain that are selected for use in creating a second and different clock domain. It should be appreciated that flip-flops are shown as one possible example of a synchronous circuit element. Other synchronous circuit elements may be used.

In its initial state, circuit design 525 does not include flip-flops 530 and 535. Rather, flip-flops 530 and 535, collectively referred to as adaptation flip-flops 540, are inserted once synchronous circuit elements of the first clock domain are selected for inclusion in the second clock domain that is to be created. Further, in its initial state, circuit design 500 only utilizes or includes clock signal 555. In one aspect, circuit design 500 prior to jitter processing may not include or utilize any clock enable signals. In another aspect, however, circuit design 500 may include or utilize a clock enable signal (not shown).

Once system 200 selects flip-flops for inclusion in the second clock domain that is to be created from, or out of, the first clock domain, additional circuit elements are inserted into circuit design 500. In particular, system 200 inserts adaptation flip-flops 540 at the boundary between the first clock domain and the second clock domain as described with reference to FIG. 3. System 200 also inserts clock signal 560 that drives adaptation flip-flops 540 and all synchronous circuit elements in circuitry 525 corresponding to the second clock domain. System 200 further inserts or includes a clock enable signal 565.

Post-jitter processing, circuit design 500 includes a first clock domain that is clocked by clock signal 555. The second clock domain is clocked by clock signal 560. Clock signal 560, for example, may have a frequency that is twice that of clock signal 555. Clock enable signal 565, however, only enables each synchronous circuit element of the second clock domain on every other, e.g., each even, clock transition edge. Clock signals 555, 560, and clock enable signal 565 may be generated by a clock manager circuit block included in the IC.

Figure 6:
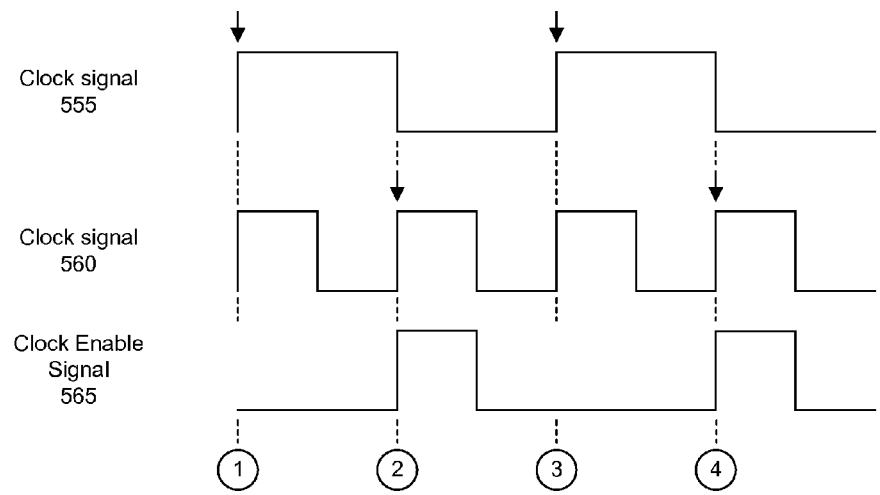
FIG. 6 is a signal timing diagram illustrating exemplary signals of the circuit design of FIG. 5.

FIG. 6 is a signal timing diagram illustrating exemplary signals of circuit design 500 of FIG. 5. As pictured, examples of clock signal 555, clock signal 560, and clock enable signal 565 are shown. For purposes of illustration, it is assumed that synchronous circuit elements are clocked on the rising edge of each respective clock signal. Thus, the clock transition edge is the rising edge of the clock signals.

Prior to jitter processing each synchronous circuit element of circuit design 500 would transition on the rising edge of clock signal 555 as indicated by the downward arrows. Thus, each synchronous circuit element would be clocked and have a transition at time 1 and at time 3. Clock signal 560 is twice the frequency of clock signal 555. Clock enable signal 565, however, only allows each synchronous circuit element clocked by clock signal 560 to transition on every other, e.g., each even, rising clock edge. Thus, synchronous circuit elements of the second clock domain transition at times 2 and 4.

Presuming that the synchronous circuit elements again are evenly split between the first and the second clock domains, the effective switching rate is increased by a factor of two. Recalling the impedance curve of FIG. 4, the jitter processing technique illustrated in FIG. 5 also produces a reduction in voltage noise from a pre-jitter reduction value of 1 unit to a post-jitter reduction value of 0.225 units.

Figure 7:
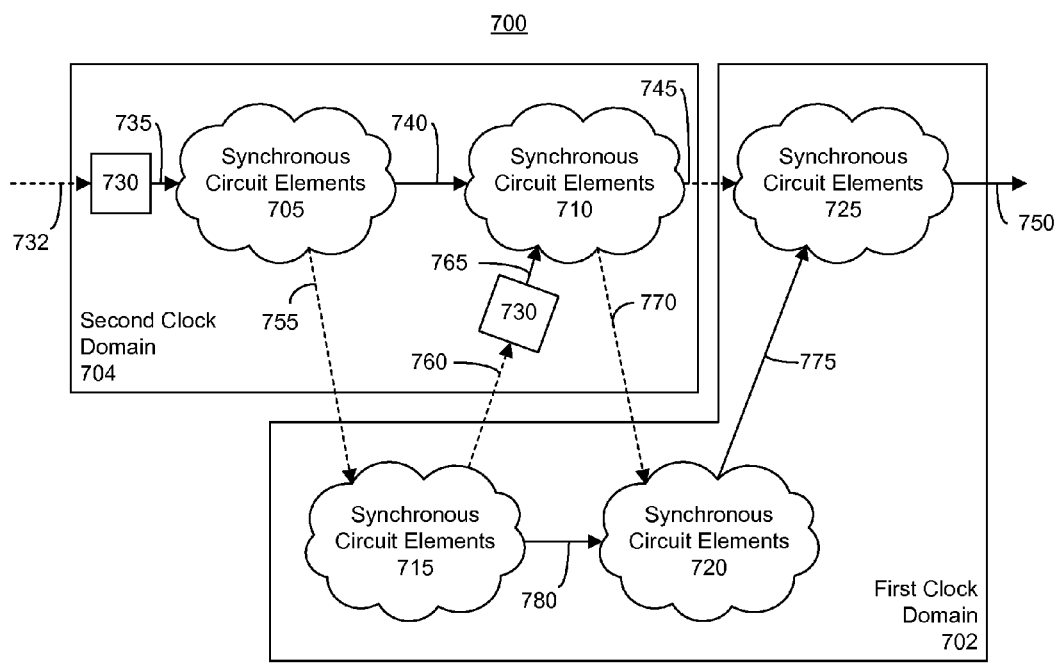
FIG. 7 is a block diagram illustrating another exemplary technique for creating a clock domain.

FIG. 7 is a block diagram illustrating another exemplary technique for creating a clock domain. FIG. 7 is a block diagram representing a portion of a programmatic circuit design (circuit design) 700 that has been operated upon by system 200 of FIG. 2. As shown, circuit design 700 includes synchronous circuit element sets 705, 710, 715, 720, and 725. For purposes of illustration, each synchronous circuit element set includes a plurality of synchronous circuit elements.

In the example pictured in FIG. 7, synchronous circuit element sets 705 and 710 have been selected from the first clock domain 702 for use in creating a second clock domain 704. Second clock domain 704 can be clocked and/or implemented using the technique illustrated in FIG. 3 or the technique illustrated in FIG. 5. In either case, for each data signal, or signals, entering second clock domain 704 from first clock domain 702 or another unaltered clock domain, an adaptation flip-flop is inserted pictured as adaptation circuitry 730. Thus, adaptation circuitry 730 is inserted into data signals entering synchronous circuit element set 705. Adaptation circuitry 730 further is inserted into data signals leaving synchronous circuit element set 715 in first clock domain 702 and entering synchronous circuit element set 710 in second clock domain 704.

Each of the dotted lines represents a data signal and denotes a half cycle timing path. For example, data signals 732, 745, 755, 760, and 770 represent signal paths where the signal must propagate from source to load in one half of the clock cycle of the original clock domain, e.g., first clock domain 702. Data signals 735, 740, 750, 765, 775, and 780 represent signal paths where the signal has an entire clock cycle to propagate. Data signals 735, 740, and 765 have a full clock cycle as determined using the clock signal for second clock domain 704. Data signals 775, 780, and 750 have a full clock cycle as determined using the clock signal for first clock domain 702.

Figure 8:
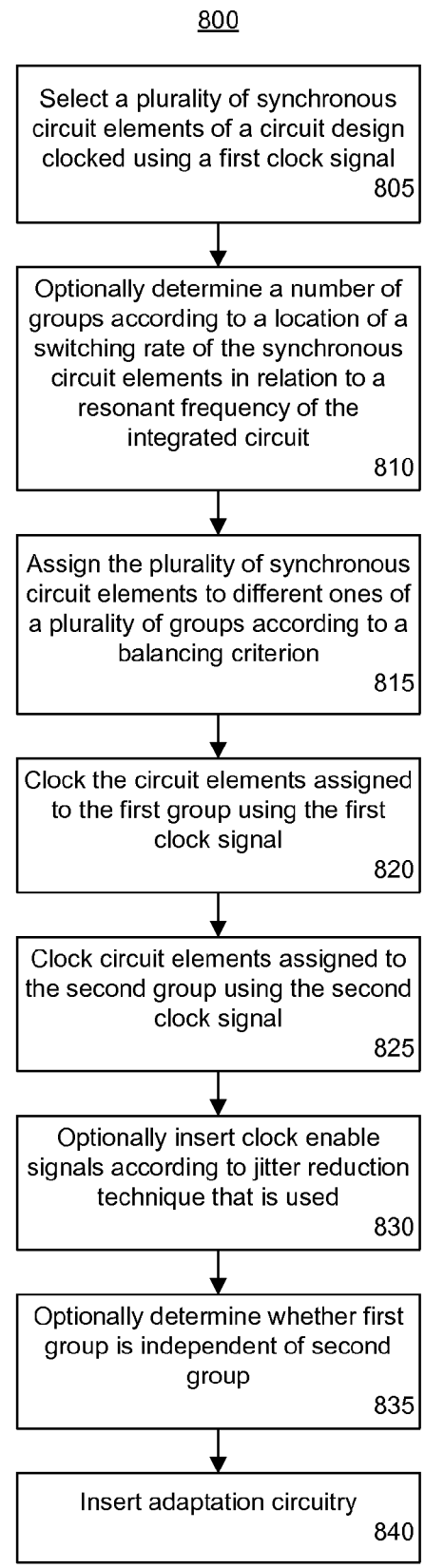
FIG. 8 is a flow chart illustrating an exemplary method of jitter reduction.

FIG. 8 is a flow chart illustrating an exemplary method 800 of jitter reduction. Method 800 is performed by a system such as system 200 described with reference to FIG. 2. Method 800 can be performed at any of a variety of stages of circuit design. For example, method 800 can be performed upon a circuit design specified in HDL code. In another example, method 800 can be performed upon a circuit design to modify a netlist post synthesis. In still another example, method 800 can be performed upon a circuit design after place and routing is performed.

Accordingly, method 800 can begin in a state where a circuit design has been loaded into the system for processing. The circuit design can include one or more clock domains. In block 805, the system selects circuit elements of the circuit design that are clocked using a first clock signal. For example, the system selects each synchronous circuit element of a first clock domain driven by a first clock signal. In one aspect, the particular clock domain that is selected for processing, i.e., jitter reduction, is one that is selected by the user of the system.

In another aspect, however, the system is configured to select and/or suggest one or more clock domains automatically to the user. The system may determine the number of synchronous circuit elements in the clock domains of the circuit design and select a clock domain having a number of synchronous circuit elements that exceeds a threshold number of synchronous circuit elements.

The system, for example, compares the number of synchronous circuit elements of clock domains with a threshold number of synchronous circuit elements. A clock domain having a number of synchronous circuit elements that exceeds the threshold number of synchronous circuit elements can be identified by the system as likely problematic in terms of the ability of the clock domain to induce voltage noise on the power supply and, as such, induce jitter in the system.

In block 810, the system optionally determines a number of groups to which synchronous circuit elements of the selected clock domain are to be assigned. The system can determine the number of groups to which the synchronous circuit elements of the selected clock domain are to be assigned according to a location of the switching rate of the synchronous circuit elements in relation to a resonant frequency of the IC in which the circuit design is to be implemented.

For example, the system may store a plot or graph of the impedance of the IC in which the circuit design is to be implemented against the switching rate of the synchronous circuit elements of the selected clock domain. The graph, which is similar to the example of FIG. 4, may be stored as part of the circuit design application that is executed. In any case, the graph specifies the resonant frequency of the IC in which the circuit design is to be implemented.

The system determines where the switching rate of the synchronous circuit elements of the selected clock domain is located on the plot. When the location of the switching rate is to the right of the resonant frequency, two or more groups are created. A one-to-one correspondence exists between groups and clock domains. As such, at least one additional clock domain will be created by the system. Thus, two or more clock domains result from the jitter reduction technique applied to the selected clock domain.

When the location of the switching rate is to the left of the resonant frequency, the system determines the number of groups necessary to shift the switching rate to a location on the plot where the impedance of the IC is decreased. As such, the system may need to create two or more additional clock domains to shift the switching rate to the right of the resonance frequency of the IC so that the impedance is lower than the impedance for the switching rate of the original, or first, clock domain. As demonstrated by the prior examples, creating one additional group will effectively shift the location on the plot to one having an x-coordinate where the switching frequency may double. The impedance is the y-coordinate of the new location. Creating two additional groups will effectively shift the location on the plot to one having an x-coordinate where the switching frequency may triple. The impedance is the y-coordinate of the new location. Creating three additional groups will effectively shift the location on the plot to one having an x-coordinate where the switching frequency may quadruple. The impedance is the y-coordinate of the new location.

In block 815, the system assigns synchronous circuit elements of the selected clock domain to different ones of the groups created in block 810. The synchronous circuit elements of the selected clock domain are assigned to groups according to one or more balancing criteria. In one example, the system assigns a number of synchronous circuit elements of the selected clock domain to each group so that the number of synchronous circuit elements in each group is within a defined tolerance of each other group as defined by the balancing criteria. In illustration, each group may have an equal number of synchronous circuit elements, a number of synchronous circuit elements within a predefined percentage of each other group, or the like.

In another example, the system assigns a number of synchronous circuit elements of the selected clock domain to each group so that an estimate of power consumption for each group is either equal to, or within, a predefined tolerance of one another as defined by the balancing criteria. In illustration, the power consumption estimated for each group based on the synchronous circuit elements assigned to each respective group will be within a predefined percentage or range of one another.

In still another example, whether assigning synchronous circuit elements according to number and/or power, etc., synchronous circuit elements can be assigned according to hierarchy of the circuit design as defined by the balancing criteria. For example, only synchronous circuit elements in a same hierarchy are assigned to a same group or set of groups. Thus, two synchronous circuit elements from different hierarchies of the circuit design would not be assigned to a same group.

Further, in assigning synchronous circuit elements to groups, the system may assign only circuit elements of a same type to a same group as defined by the balancing criteria. For example, a clock domain may include flip-flops, DSPs, BRAMs, and other clocked circuit elements. In assigning the synchronous circuit elements to different groups, only flip-flops are assigned to groups with other flip-flops. Only DSPs are assigned to groups with DSPs, etc.

In block 820, the system clocks the synchronous circuit elements assigned to the first group using the first clock signal. In block 825, the system clocks the synchronous circuit elements assigned to the second group using a second and different clock signal. In one example, the system inserts inverters as appropriate to generate the second clock signal from the first clock signal. Alternatively, the system generates the second clock signal by configuring a clock manager to generate the second clock signal having a selected phase offset, e.g., 180 degrees, from the first clock signal.

For purposes of illustration, method 800 is described using a first group and a second group. It should be appreciated, however, that additional groups, and thus clock domains, may be created. In that case, the additional clock signals that are used and/or created will have varying amounts of phase offset with respect to the first clock signal.

In another example, the system creates a second clock signal having a frequency that is twice the frequency of the first clock signal. In that case, as illustrated in block 830, the system inserts clock enable signals. Each synchronous circuit element of the second group is clocked by the second clock signal and enabled using the clock enable signal. As noted, the clock enable signal enables, or makes active, each synchronous circuit element of the second group, and thus, second clock domain, on every other clock transition edge of the second clock signal.

In block 835, the system optionally determines whether the first group is independent of the second group. One group of synchronous circuit elements is independent of another group of synchronous circuit elements when no data signals are shared among the two groups. One example of such a situation is where the first group of synchronous circuit elements includes transmitter circuitry of a transceiver and the second group of synchronous circuit elements includes the receiver circuitry. Typically, the transmitter circuitry belongs to one hierarchy, while the receiver circuitry belongs to a different hierarchy. Both the transmitter circuitry and the receiver circuitry may be in the same clock domain, but no data signals are shared between transmitter circuitry and receiver circuitry. In general, different hierarchies in a same clock domain will be independent of one another. As noted, synchronous circuit elements may be assigned to groups in accordance with circuit design hierarchy, e.g., where only synchronous circuit elements of a same hierarchy are in a same group.

In block 840, adaptation circuitry, e.g., flip-flops, are inserted. In one aspect, adaptation circuitry is inserted based upon block 835. For example, when two groups are determined to be independent of one another, no adaptation circuitry is required. As discussed, adaptation circuitry, which is clocked using the second clock signal, is only needed for data signals leaving the first clock domain and entering the second clock domain.

The inventive arrangements disclosed within this specification reduce jitter within a circuit design to be implemented within an IC. A circuit design is processed so that one, or more, clock domains are selected for processing. Each clock domain can be split into a plurality of clock domains resulting in a higher switching rate for the synchronous circuit elements. The resulting circuit design is functionally equivalent to the original circuit design, but exhibits less jitter due to the increase in switching rate of the synchronous circuit elements and corresponding reduction in impedance on the impedance curve of the IC.

The various examples provided within this specification have been described largely with reference to flip-flops. It should be appreciated, however, that the techniques described also can be applied to other circuit element types such as BRAMs, DSPs, and the like. As noted, grouping can be performed according to synchronous circuit element type in the case where a clock domain includes multiple, different types of synchronous circuit elements.

In addition, the techniques described herein can be applied to the design of particular circuit blocks. For example, selected types of circuit blocks such as DSPs include a large number of flip-flops. As such, the jitter reduction techniques described herein can be applied on a circuit block level when designing a larger circuit block such as a DSP, a BRAM, or the like.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects disclosed within this specification can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects can be embedded in a computer program product, which includes all the features enabling the implementation of the methods described herein. The computer program product includes a data storage medium which is a non-transitory computer-usable or computer-readable storage medium, storing program code that, when loaded and executed in a system including a processor, causes the system to initiate and/or perform at least a portion of the functions and/or operations described within this specification. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this specification, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

The features disclosed within this specification can be embodied in other forms without departing from the spirit or essential attributes thereof. Accordingly, reference should be made to the following claims, rather than to the foregoing specification, as indicating the scope of such features and implementations.

What is claimed is:

1. A method of reducing jitter in a circuit design, the method comprising:
    selecting a plurality of circuit elements of a circuit design clocked using a first clock signal;
    assigning, using a processor, the plurality of circuit elements to different ones of a plurality of groups according to a balancing criterion;
    clocking the circuit elements assigned to a first group of the plurality of groups using the first clock signal; and
    clocking the circuit elements assigned to a second group of the plurality of groups using a second clock signal different from the first clock signal.

2. The method of claim 1, further comprising:
    inserting an adaptation flip-flop for each data signal provided from a circuit element of the first group to a circuit element of the second group;
    wherein each adaptation flip-flop is clocked using the second clock signal.

3. The method of claim 1, wherein the first clock signal and the second clock signal have a same frequency and a different phase.

4. The method of claim 1, wherein the second clock signal has a frequency that is twice the frequency of the first clock signal, the method further comprising:
    clock enabling each circuit element of the second group to be active on every other clock transition edge of the second clock signal.

5. The method of claim 1, wherein selecting the plurality of circuit elements comprises:
    comparing a number of the plurality of circuit elements with a threshold number of circuit elements clocked using the first clock signal;
    wherein the plurality of circuit elements are assigned to different ones of the plurality of groups responsive to determining that the number of the plurality of circuit elements exceeds the threshold number of circuit elements.

6. The method of claim 1, further comprising:
    determining a number of groups to which the plurality of circuit elements are assigned according to a location of a switching rate of the plurality of circuit elements in relation to a resonant frequency for an integrated circuit in which the circuit design is to be implemented.

7. The method of claim 1, wherein the balancing criterion specifies that each group comprises a number of circuit elements of the plurality of circuit elements within a defined tolerance of each other group.

8. The method of claim 1, wherein the balancing criterion specifies that each group is estimated to consume an amount of power within a defined tolerance of each other group.

9. A system, comprising:
    a processor coupled to a memory storing program code, wherein the processor, upon executing the program code, is programmed to initiate executable operations comprising:
    selecting a plurality of circuit elements of a circuit design clocked using a first clock signal;
    assigning the plurality of circuit elements to different ones of a plurality of groups according to a balancing criterion;
    clocking the circuit elements assigned to a first group of the plurality of groups using the first clock signal; and
    clocking the circuit elements assigned to a second group of the plurality of groups using a second clock signal different from the first clock signal.

10. The system of claim 9, wherein the processor is further programmed to initiate executable operations comprising:
    inserting an adaptation flip-flop for each data signal provided from a circuit element of the first group to a circuit element of the second group;
    wherein each adaptation flip-flop is clocked using the second clock signal.

11. The system of claim 9, wherein the first clock signal and the second clock signal have a same frequency and a different phase.

12. The system of claim 9, wherein the second clock signal has a frequency that is twice the frequency of the first clock signal, the method further comprising:
    clock enabling each circuit element of the second group to be active on every other clock transition edge of the second clock signal.

13. The system of claim 9, wherein the processor is further programmed to initiate executable operations comprising:
    comparing a number of the plurality of circuit elements with a threshold number of circuit elements clocked using the first clock signal;
    wherein the plurality of circuit elements are assigned to different ones of the plurality of groups responsive to determining that the number of the plurality of circuit elements exceeds the threshold number of circuit elements.

14. The system of claim 9, wherein the processor is further programmed to initiate executable operations comprising:
    determining a number of groups to which the plurality of circuit elements are assigned according to a location of a switching rate of the plurality of circuit elements in relation to a resonant frequency for an integrated circuit in which the circuit design is to be implemented.

15. The system of claim 9, wherein the balancing criterion specifies that each group comprises a number of circuit elements of the plurality of circuit elements within a defined tolerance of each other group.

16. The system of claim 9, wherein the balancing criterion specifies that each group is estimated to consume an amount of power within a defined tolerance of each other group.

17. A non-transitory computer-readable storage medium having instructions which, when executed by a processor, perform a method comprising:

selecting a plurality of circuit elements of a circuit design clocked using a first clock signal;

assigning the plurality of circuit elements to different ones of a plurality of groups according to a balancing criterion;

clocking the circuit elements assigned to a first group of the plurality of groups using the first clock signal; and clocking the circuit elements assigned to a second group of the plurality of groups using a second clock signal different from the first clock signal.

18. The non-transitory computer-readable storage medium of claim 17, wherein the method further comprises:

inserting an adaptation flip-flop for each data signal provided from a circuit element of the first group to a circuit element of the second group;

wherein each adaptation flip-flop is clocked using the second clock signal.

19. The non-transitory computer-readable storage medium of claim 17, wherein the first clock signal and the second clock signal have a same frequency and a different phase.

20. The non-transitory computer-readable storage medium of claim 17, wherein the second clock signal has a frequency that is twice the frequency of the first clock signal, the method further comprising:

clock enabling each circuit element of the second group to be active on every other clock transition edge of the second clock signal.

\* \* \* \* \*